United States Patent
Yano et al.

(10) Patent No.: US 8,885,618 B2
(45) Date of Patent: Nov. 11, 2014

(54) WIRELESS COMMUNICATIONS SYSTEM, BASE STATION, AND MOBILE STATION

(75) Inventors: Tetsuya Yano, Kawasaki (JP); Kazuhisa Obuchi, Kawasaki (JP); Shunji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 12/959,808

(22) Filed: Dec. 3, 2010

(65) Prior Publication Data

US 2011/0075645 A1 Mar. 31, 2011

Related U.S. Application Data

(62) Division of application No. 11/130,541, filed on May 17, 2005, now Pat. No. 8,665,839.

(30) Foreign Application Priority Data

Dec. 14, 2004 (JP) ................................. 2004-361069

(51) Int. Cl.
| | | |
|---|---|---|
| H04B 7/212 | (2006.01) | |
| H04N 5/225 | (2006.01) | |
| H04W 72/00 | (2009.01) | |
| H04W 36/38 | (2009.01) | |
| H04W 36/00 | (2009.01) | |
| H04W 72/04 | (2009.01) | |
| H04B 7/26 | (2006.01) | |
| H04W 4/02 | (2009.01) | |
| H04W 56/00 | (2009.01) | |

(52) U.S. Cl.
CPC .......... *H04W 36/38* (2013.01); *H04W 36/0088* (2013.01); *H04W 72/0446* (2013.01); *H04B 7/2643* (2013.01); *H04W 4/02* (2013.01); *H04W 56/00* (2013.01); *H04W 72/04* (2013.01); *H04B 7/2656* (2013.01)

USPC ........ 370/337; 348/207.1; 375/295; 375/354; 375/364; 375/371; 398/154; 398/25; 398/68; 455/450; 701/1

(58) Field of Classification Search
CPC . H04W 72/04; H04W 72/0446; H04W 56/00; H04W 4/02; H04B 7/2643; H04B 7/2656
See application file for complete search history.

(56) References Cited

U.S. PATENT DOCUMENTS 5,117,502 A 5/1992 Onoda et al.
5,898,929 A * 4/1999 Haartsen ...................... 455/462

(Continued)

FOREIGN PATENT DOCUMENTS

| EP | 1 081 979 | 3/2001 |
| EP | 1 098 540 | 5/2001 |

(Continued)

OTHER PUBLICATIONS

European Search Report dated Mar. 16, 2006, from corresponding European Application No. EP 05 25 2990.

(Continued)

*Primary Examiner* — Hassan Phillips
*Assistant Examiner* — Lonnie Sweet
(74) *Attorney, Agent, or Firm* — Katten Muchin Rosenman LLP

(57) ABSTRACT

A wireless communications system including a mobile station MS and base stations BS1 and BS2, wherein one or both of the mobile station MS and the base stations BS1 and BS2 is provided with a unit for notifying information of a frame position with the possibility of transmission of packets based on detection of deterioration of a reception quality and wherein the mobile station MS is provided with a unit for determining a frame position without the possibility of transmission of packets and shifting to a peripheral cell detection mode at this frame position based on information of a frame position with the possibility of transmission of packets, whereby it is possible to shift to a peripheral cell detection mode without lowering the transmission efficiency and without complicating the processing.

12 Claims, 13 Drawing Sheets

(56) References Cited

U.S. PATENT DOCUMENTS

| | | | |
|---|---|---|---|
| 6,122,270 | A | 9/2000 | Whinnett et al. |
| 6,201,966 | B1 | 3/2001 | Rinne et al. |
| 6,542,478 | B1 * | 4/2003 | Park ............ 370/308 |
| 6,633,556 | B1 | 10/2003 | Sato |
| 7,266,374 | B2 | 9/2007 | Kim |
| 2003/0108027 | A1 | 6/2003 | Kim et al. |
| 2003/0224775 | A1 | 12/2003 | Suda et al. |
| 2004/0048616 | A1 | 3/2004 | Kobylinski et al. |
| 2004/0085938 | A1 * | 5/2004 | Tiedemann et al. ...... 370/335 |
| 2004/0156367 | A1 | 8/2004 | Albuquerque et al. |
| 2004/0179506 | A1 * | 9/2004 | Padovani et al. ........ 370/342 |
| 2005/0122999 | A1 | 6/2005 | Scherzer et al. |

FOREIGN PATENT DOCUMENTS

| | | |
|---|---|---|
| JP | 3-268697 | 11/1991 |
| JP | 9-36913 | 2/1997 |
| JP | 11-41645 | 2/1999 |
| JP | 11-88945 | 3/1999 |
| JP | 2003-158481 | 5/2003 |
| WO | 97/40593 | 10/1997 |
| WO | 01/41492 | 6/2001 |

OTHER PUBLICATIONS

United States Office Action dated Apr. 29, 2008, from corresponding U.S. Appl. No. 11/130,541.
United States Office Action dated Aug. 21, 2008, from corresponding U.S. Appl. No. 11/130,541.
United States Office Action dated Apr. 13, 2009, from corresponding U.S. Appl. No. 11/130,541.
United States Office Action dated Dec. 21, 2009, from corresponding U.S. Appl. No. 11/130,541.
United States Office Action dated Sep. 16, 2010, from corresponding U.S. Appl. No. 11/130,541.
Japanese Office Action dated Aug. 2, 2013, from corresponding Japanese Application No. 2012-023134.
United States Office Action dated Mar. 19, 2013, from corresponding U.S. Appl. No. 11/130,541.

* cited by examiner

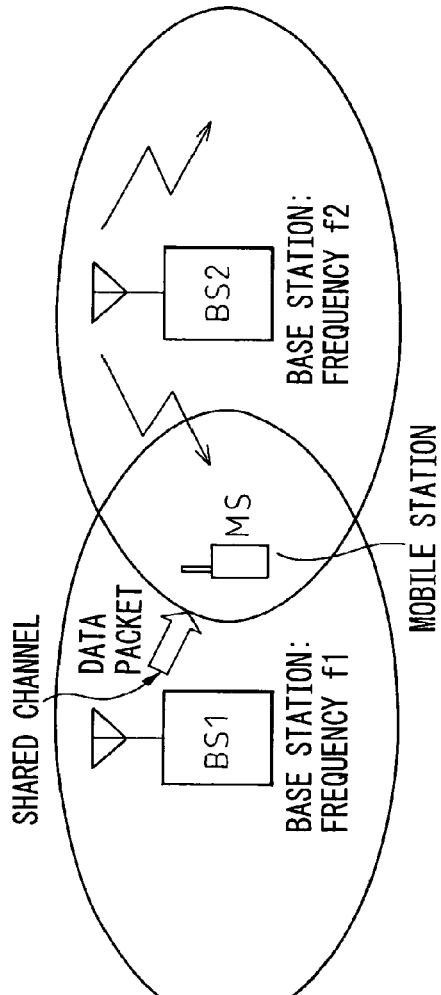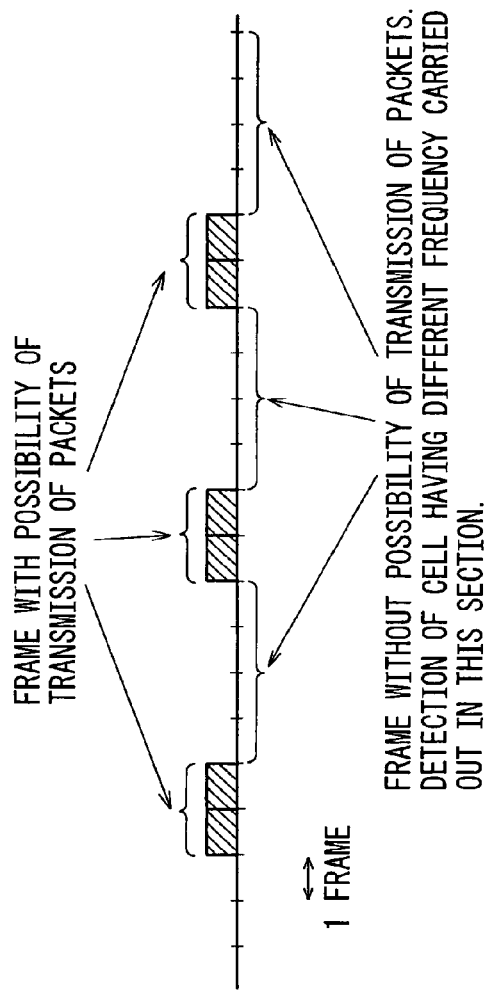

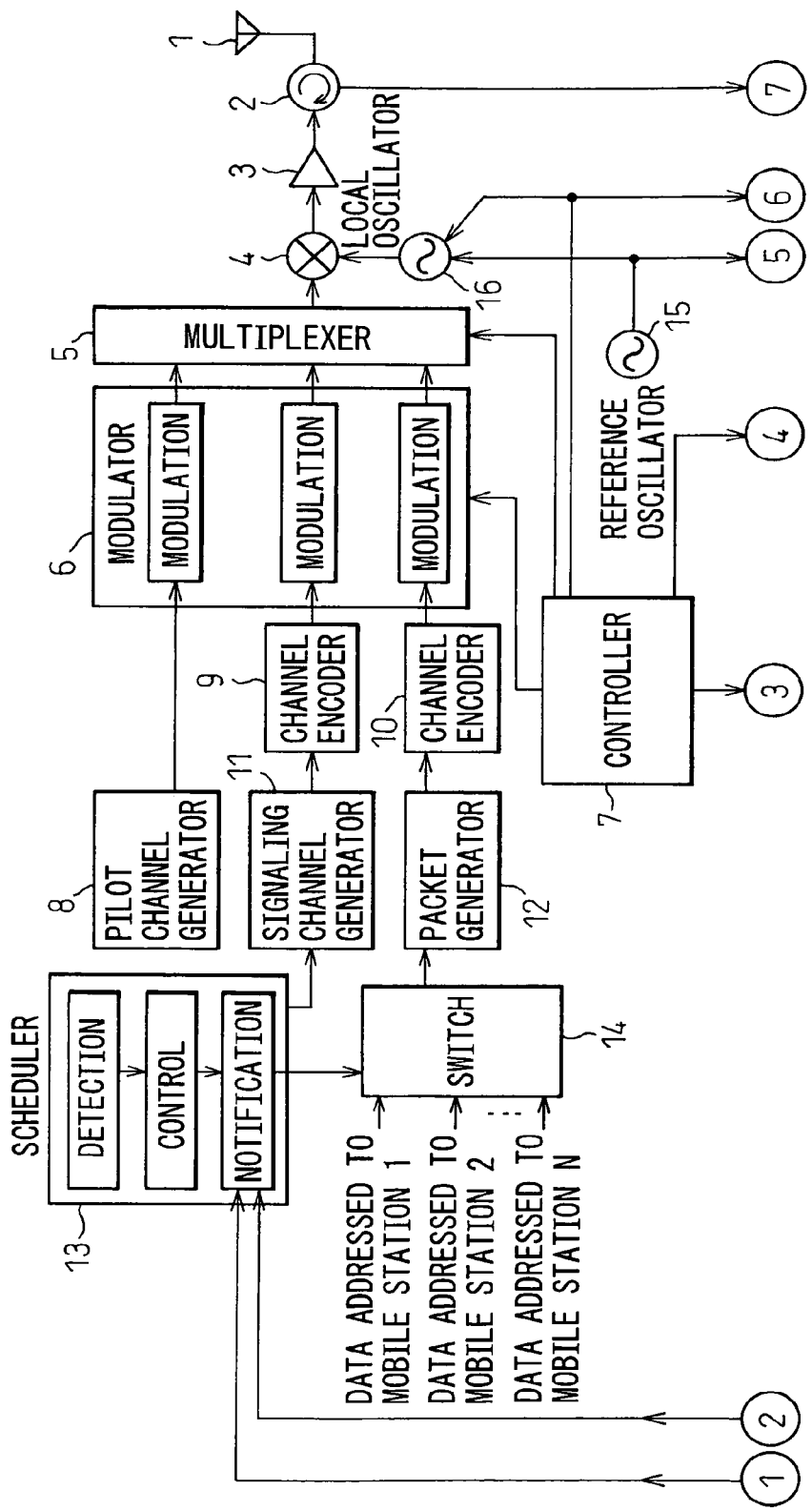

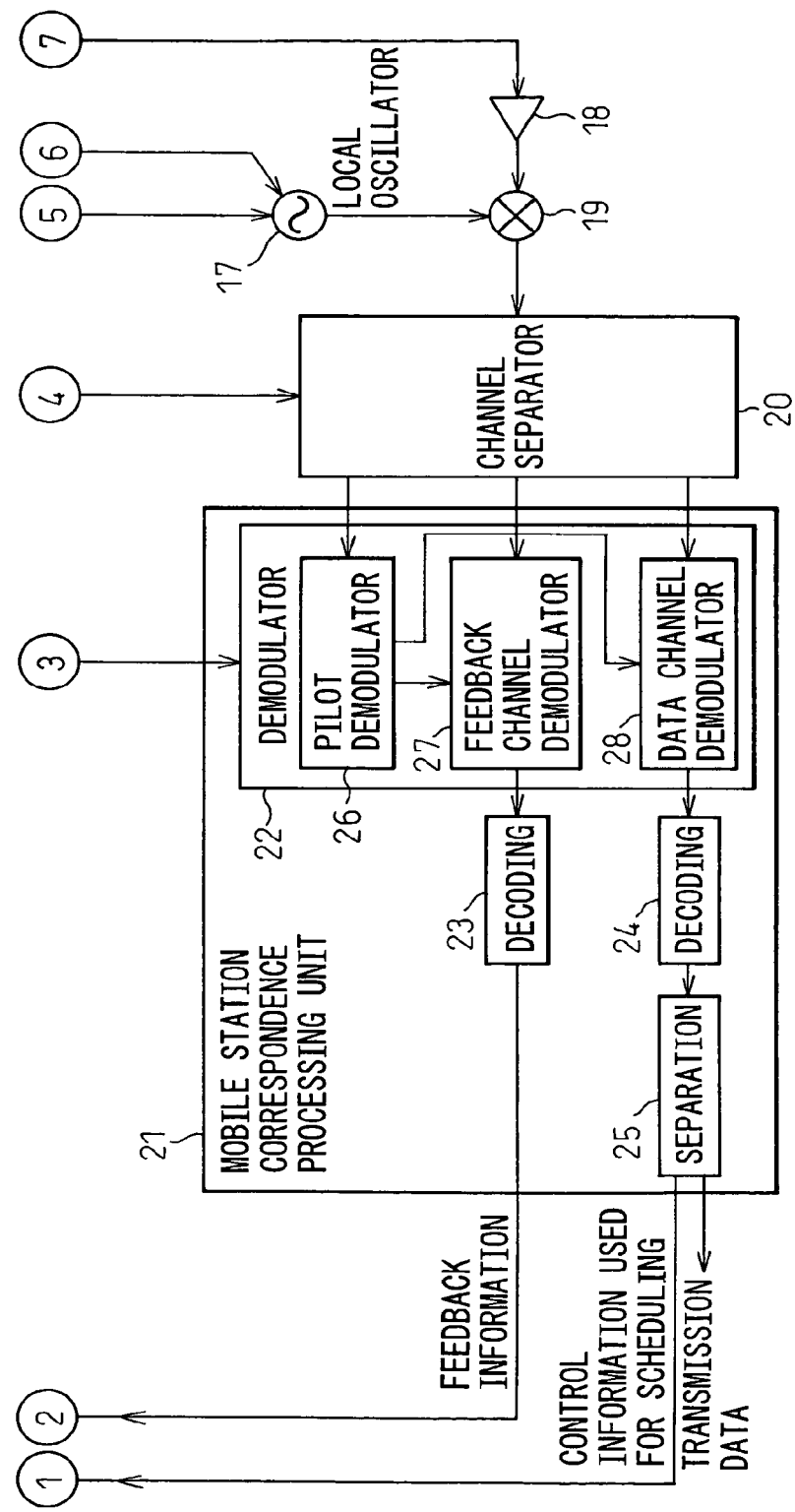

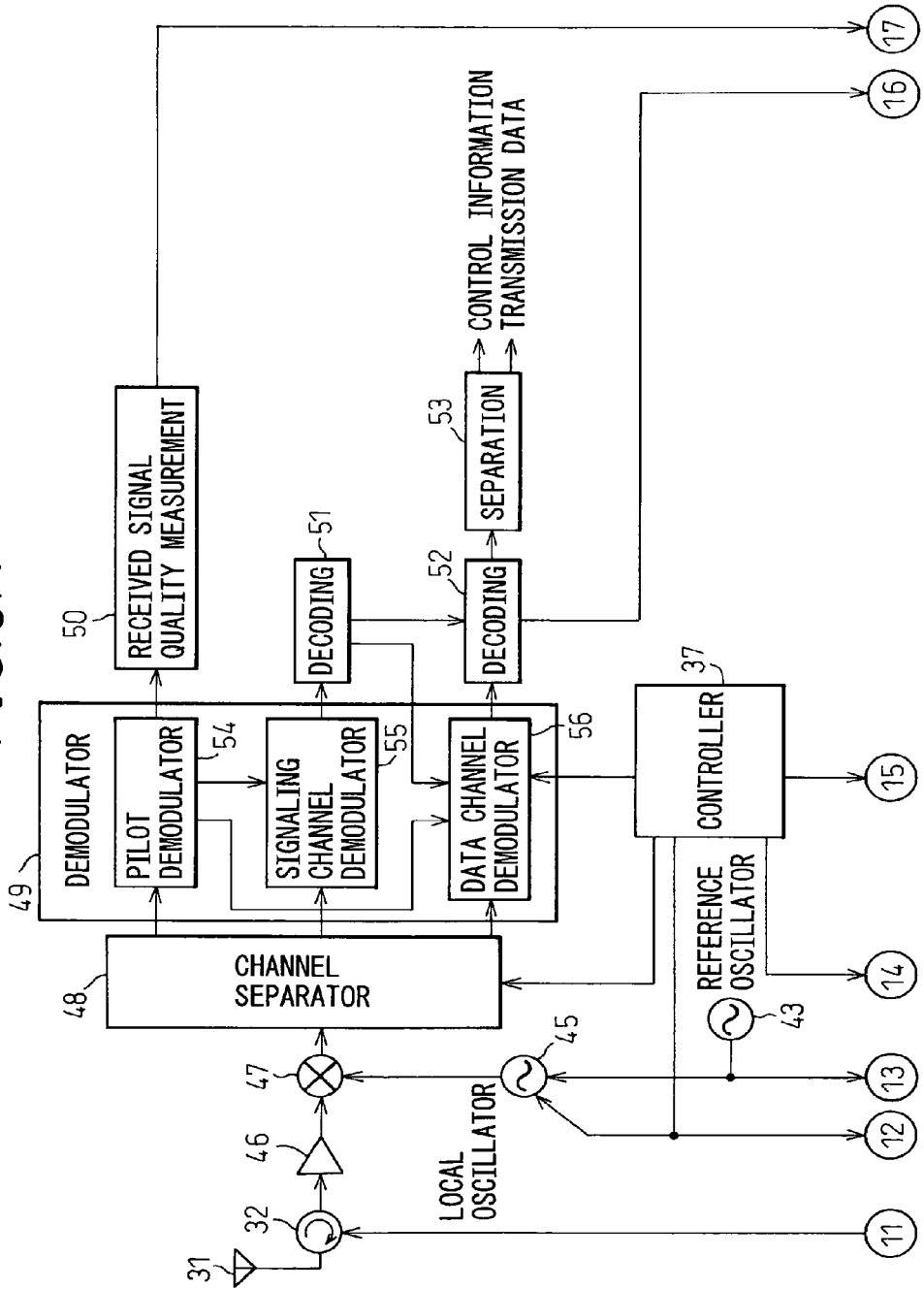

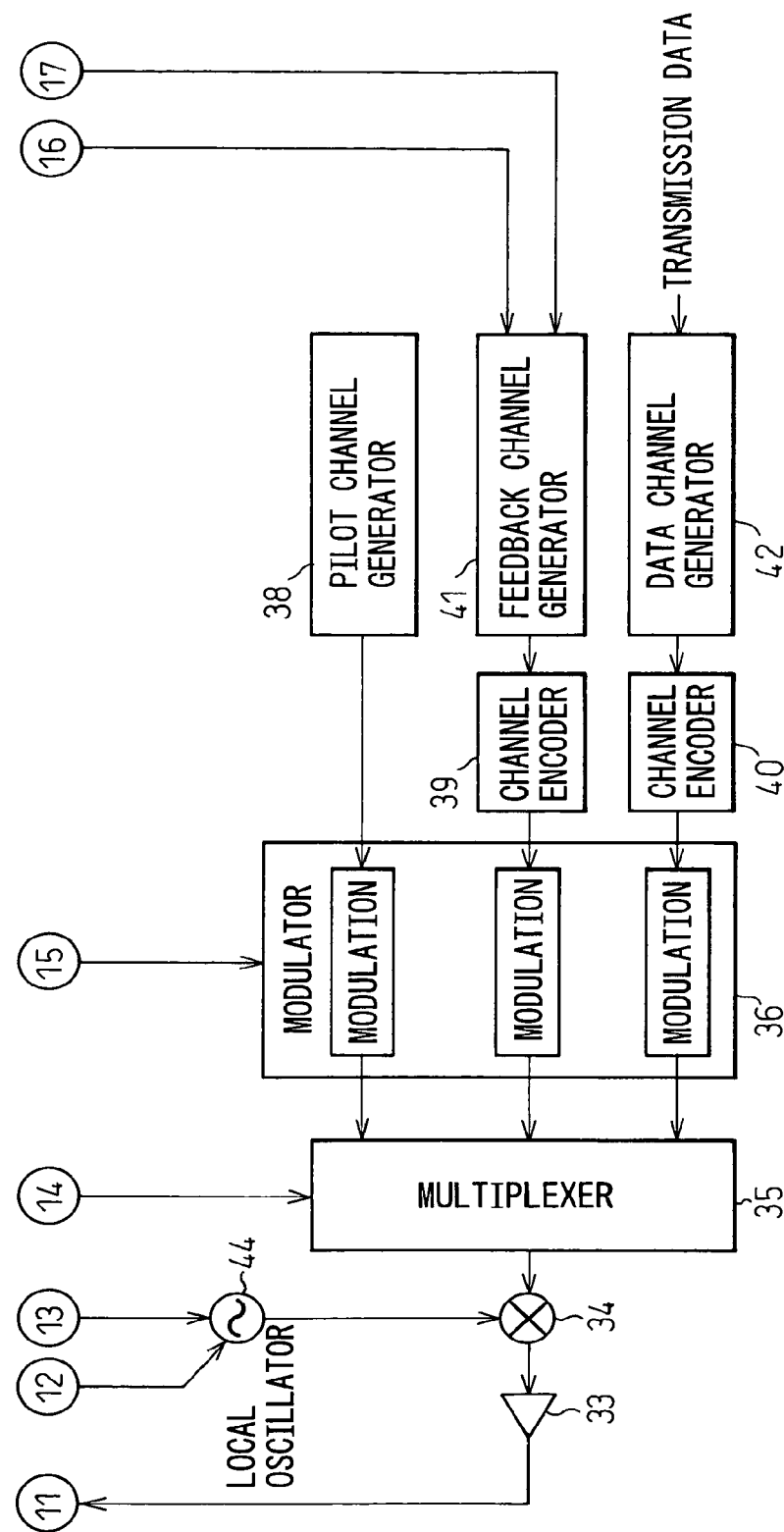

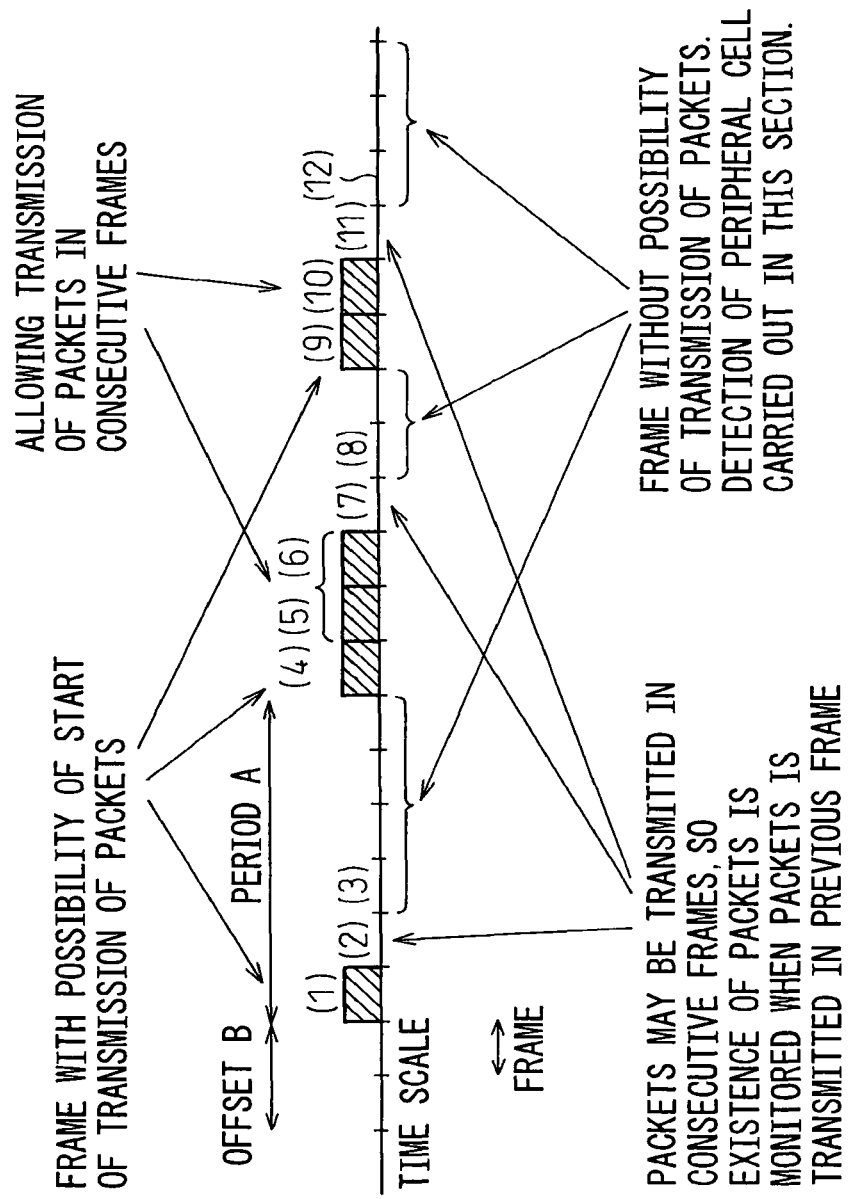

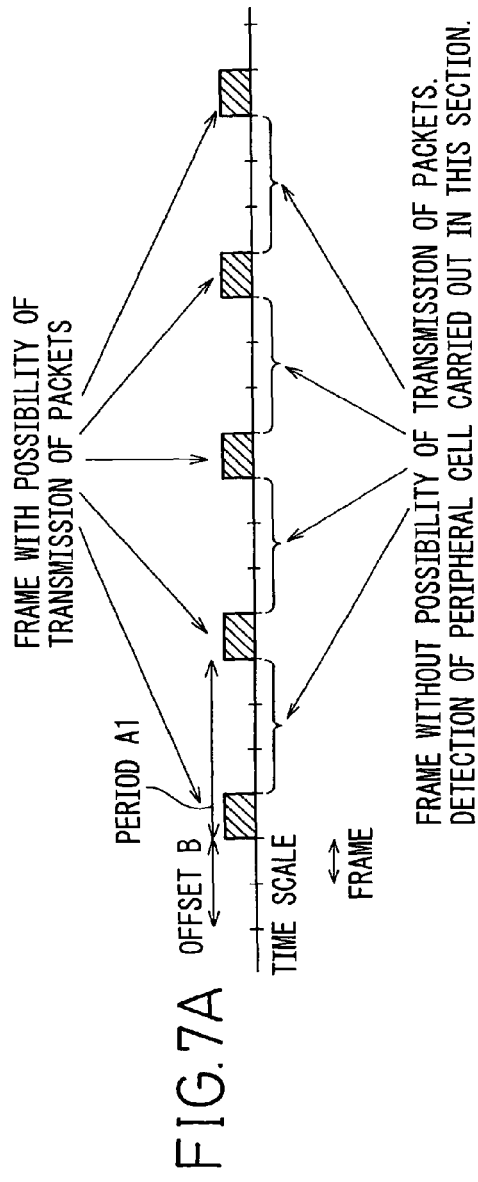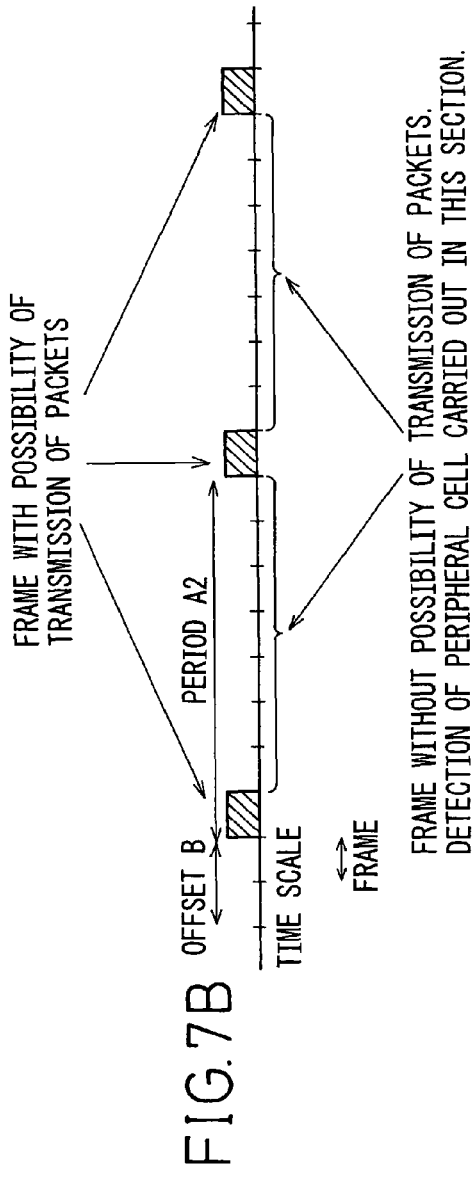

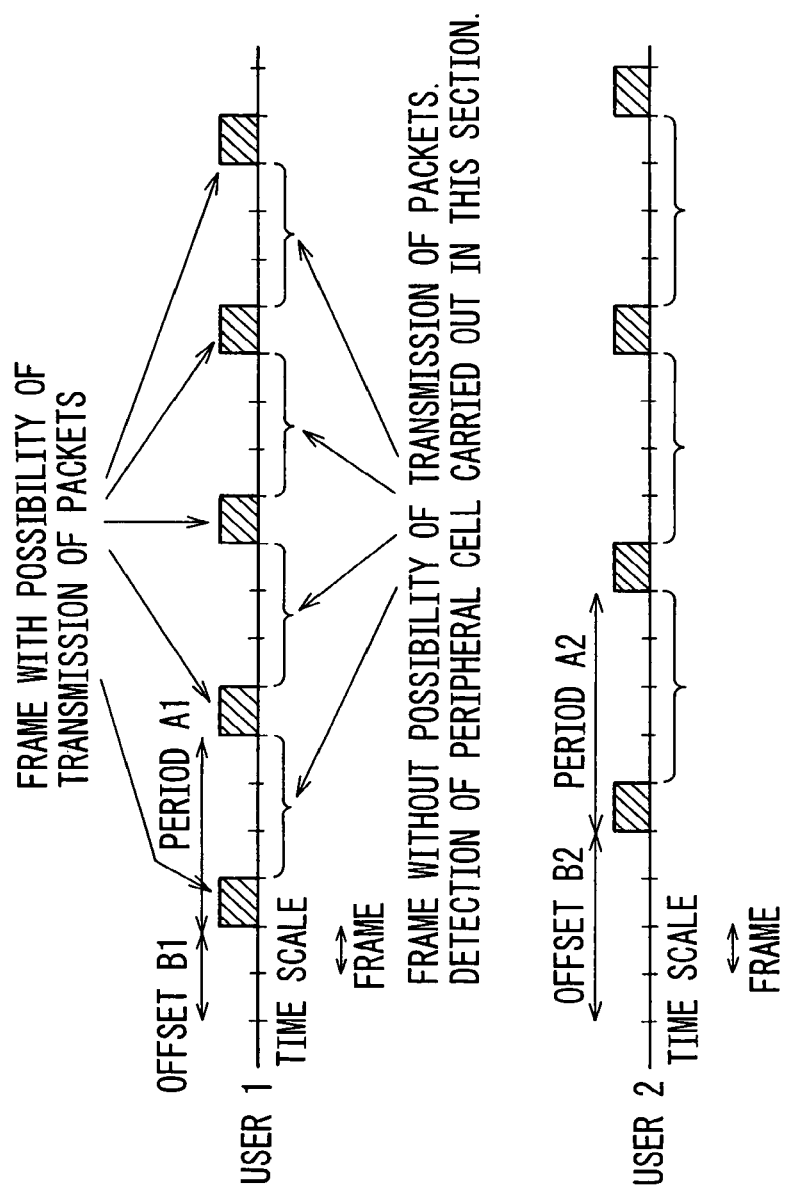

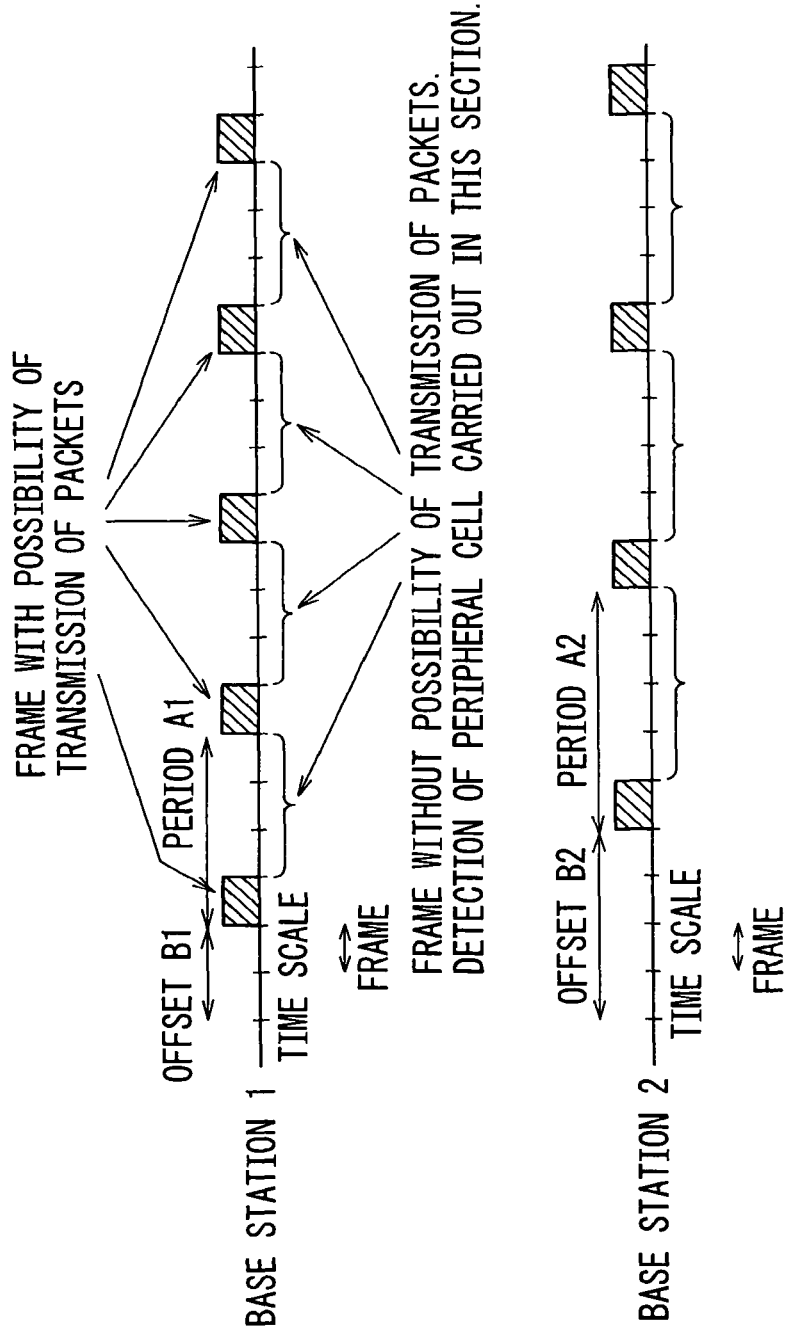

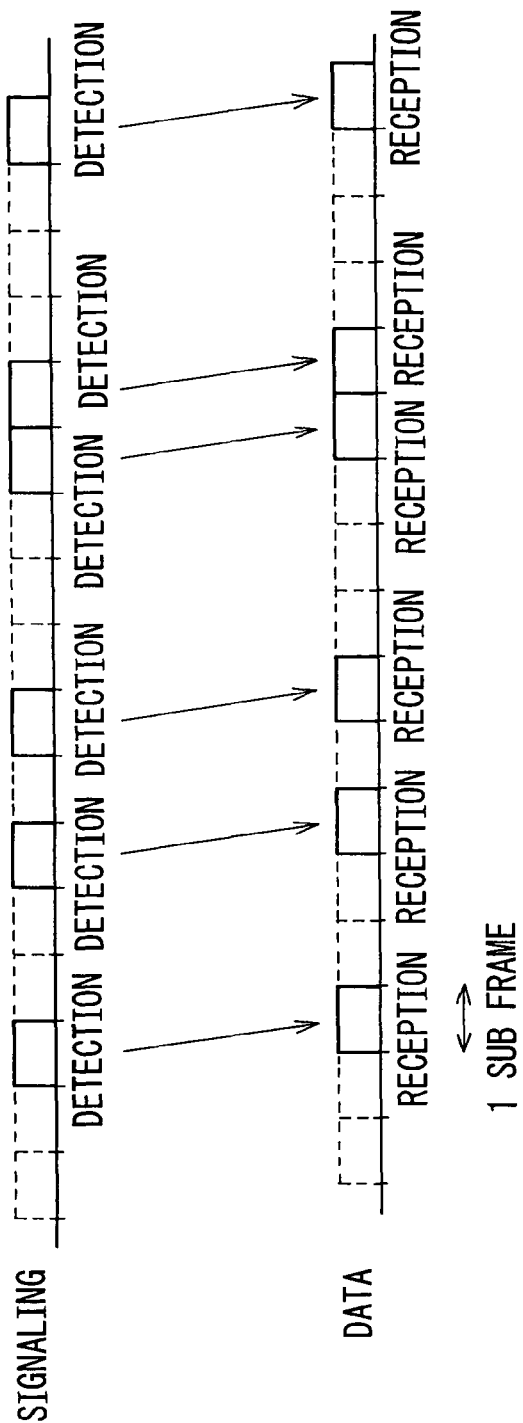

WIRELESS COMMUNICATIONS SYSTEM, BASE STATION, AND MOBILE STATION

BACKGROUND OF THE INVENTION

1. Field of the Invention

The present invention relates to a wireless communications system, a base station, and a mobile station, wherein the mobile station performs wireless communication with the base station with handover being smoothly executed.

2. Description of the Related Art

At the present time, a variety of wireless communications systems are being put into practical use. One such wireless communications system is the W-CDMA (Wideband-Code Division Multiple Access) system. Further, the HSDPA (High Speed Downlink Packet Access) using W-CDMA to raise the transmission rate in the downlink by a maximum of 14 Mbps. An adaptive modulation and coding scheme is used in HSDPA systems wherein the system adaptively switches, for example, between a QPSK (Quadrature Phase Shift Keying) modulation scheme and a 16-value QAM (Quadrature Amplitude Modulation) scheme so as to obtain the transmission rate corresponding to the state of the wireless transmission line.

In the HSDPA system, an H-ARQ (Hybrid Automatic Repeat Request) mode is employed. When a mobile station detects an error in reception data from a base station, it requests retransmission of data from the base station. Then the base station retransmits the data and the mobile station performs error correction and decoding processing using both the previously received data and the retransmitted data (refer to, for example, 3GPP TS 25.211 v5.5.0 (3rd Generation Partnership Project; Technical Specification Group Radio Access Network; Physical channels and mapping of transport channels onto physical channels (FDD)) or 3GPP TS 25.212 v5.9.0 (3rd Generation Partnership Project; Technical Specification Group Radio Access Network; Multiplexing and channel coding (FDD)).

Further, the main wireless channels in the HSDPA system include an HS-SCCH (High Speed-Shared Control Channel), HS-PDSCH (High Speed-Physical Downlink Shared Channel), HS-DPCCH (High-Speed-Dedicated Physical Control Channel), etc.

The HS-SCCH and HS-PDSCH channels explained above are shared channels of the down side (downlink) from a base station to a mobile station in a wireless communications system, and the HS-SCCH is a control channel for transmitting a variety of parameters concerning data transmitted by the HS-PDSCH and a channel for pre-announcement of data transmission. Such parameters include, for example, modulation type information indicating the modulation scheme for transmitting the data by the HS-PDSCH, the number of spreading codes, and the pattern information of rate matching processing applied to the transmission data.

Further, the HS-DPCCH is an individual control channel at the up side (uplink) from a mobile station to a base station in a wireless communications system and is used when transmitting an ACK signal or a NACK signal corresponding to whether normal reception of the data received by the HS-PDSCH is possible or not from the mobile station to the base station. For example, in a case a CRC error is detected in the reception data, etc., the mobile station transmits a NACK signal to the base station. The base station will then perform processing for retransmission based on the NACK signal. Further, the HS-DPCCH is used to report the reception quality (for example SIR (Signal to Interference Ratio)) of the received signal from the base station and periodically transmits the result as a CQI (Channel Quality Indicator) to the base station. The base station judges the quality of the wireless environment in the downlink based on this CQI, switches the modulation scheme to the modulation scheme making higher speed transmission of data possible when the wireless environment is good, or, conversely, switches the modulation scheme to the modulation scheme for transmitting the data at a lower speed when the wireless environment is poor.

FIG. 9 is an explanatory view of the channels in the HSDPA and shows schematic views of a CPICH, P-CCPCH, HS-SCCH, HS-PDSCH, and HS-DPCCH. The CPICH (Common Pilot Channel) and P-CCPCH (Primary Common Control Physical Channel) are common channels in the downlink, wherein the CPICH is a channel utilized for channel estimation, a cell search, and as a timing standard of the other downlink physical channels in the same cell in the mobile station and as a channel for transmitting a so-called pilot signal. Further, the P-CCPCH is a channel for transmitting broadcast information. Further, HS-SCCH, HS-PDSCH, and HS-DPCCH show the above wireless channels and transmit the above CQI and ACK/NACK by HS-DPCCH.

Further, since 15 slots comprise 1 frame, and CPICH is used as the timing standard, the frame heads of P-CCPCH and HS-SCCH coincide with the frame head of the CPICH, but the frame head of HS-PDSCH is delayed by the amount of 2 slots. This allows the mobile station to receive information required to demodulate and discriminate the HS-PDSCH ahead of time. Hence, this information is used in the demodulation and decoding of the HS-PDSCH by notifying, in advance, information regarding the modulation scheme, spreading codes, etc., for pre-announcement by the HS-SCCH. Further, in the HS-SCCH and HS-PDSCH, 3 slots comprise 1 sub frame.

Referring to 3GPP, TS25.212v.5.7.0, the information by the HS-SCCH is described below in (a) to (g).

(a) Xccs (Channelization Code Set Information); 7 bits; Information of spreading codes used in HS-DSCH.

(b) Xms (Modulation Scheme Information); 1 bit; Modulation scheme used in HS-DSCH.

(c) Xtbs (Transport-Block Size Information); 6 bits; Block size of error corrected and encoded transmission data.

(d) Xhap (Hybrid-ARQ Process Information); 3 bits; Retransmission controlled process number.

(e) Xrv (Redundancy and Constellation Version); 3 bits; Parameter of rate matching.

(f) Xnd (New Data Indicator); 1 bit; Information of whether is it new data.

(g) Xue (UE Identity); 16 bits; User identification information.

As described above, the HS-SCCH has a structure of 37 bits in total. By receiving the HS-SCCH, parameters used in the HS-DSCH, such as, the modulation scheme, spreading codes, and error correction can be learned. Accordingly, the HS-PDSCH can be demodulated and decoded according to these parameters.

Xccs described above in (a) indicates the spreading codes when the data is transmitted by the HS-PDSCH and can indicate, for example, a combination of the number of multi-codes and code offset. Further, Xms described above in (b) indicates whether the modulation scheme is, for example, QPSK or 16 QAM by a "0" or "1". Further, Xtbs described above in (c) indicates data for calculating the size of data transmitted by 1 sub frame of the HS-PDSCH, and Xhap described above in (d) indicates the process number of H-ARQ and uses the same number as the process number of the transmission data of the previous time at the time of retransmission.

Further, Xrv described above in (e) indicates the redundancy version parameter and the constellation parameter at the time of retransmission of the HS-PDSCH and includes a case where the parameters are updated and a case where the parameters are not changed in new transmission and retransmission. Further, Xnd described above in (f) is data indicating whether the transmission block of the HS-PDSCH is a new block or a retransmission block. A new block alternately changes the data between "1" and "0", while a retransmission block keeps the data the same as before, i.e., does not change the data. This enables the two to be differentiated. Further, Xue described above in (g) is identification (ID) information of the mobile station (user).

By receiving the HS-SCCH, the parameters of the modulation scheme, spreading codes, and error correction applied in the HS-PDSCH are recognized, and demodulation and decoding of the HS-PDSCH can be carried out (refer to 3GPP TS 25.211 v5.5.0, 3GPP TS 25.212 v5.9.0, 3GPP TS 25.214 v5.7.0 (3rd Generation Partnership Project; Technical Specification Group Radio Access Network; Physical layer procedures (FDD)).

A simple explanation will be given of the operation of packet transmission applying the HSDPA system to the above W-CDMA system.

The base station transmits the data via the shared channel (HS-PDSCH) and selects the mobile station to which data is to be transmitted via this shared channel from among a plurality of mobile stations. Then, the base station sequentially transmits the radio frames storing the data addressed to the selected mobile station. At this time, the base station pre-announces the transmission of data prior to data transmission via the control channel (HS-SCCH).

For example, as shown in FIG. 10, the base station transmits signaling by the control channel (HS-SCCH) indicating transmission of data (packets) when transmitting data (packets) to a certain mobile station. On the other hand, the mobile station constantly monitors this control channel and performs processing for reception of the data packets by detecting signaling addressed to it.

It should be noted that, in FIG. 10, the signaling signals, indicated by broken lines, indicate signals addressed to other mobile stations, the case where the mobile station for the pre-announcement of transmission does not exist, or the case where a signaling signal is not to be transmitted. Naturally data for a portion in which the signaling signal is not transmitted is not transmitted.

As explained above, when transmitting data from the base station via the shared channel and performing handover processing, the mobile station must measure the received signal from a peripheral cell. For such a handover, the following technique has been proposed.

For example, in a wireless communications system asynchronously performing packet communication, the mobile station receives a beacon transmitted from a base station at a constant cycle, measures the level of reception and, when the measurement result is less than a threshold value, transmits a state transition packet to the base station and shifts to a communication suppression mode such as a power save mode. A wireless communications system has been proposed in which the mobile station stops transmitting and receiving data in this communication suppression mode, searches for another base station during this communication suppression mode and, when shifting from this communication suppression mode to the normal mode, transmits a state transition packet and returns to the normal mode (refer to, for example, Japanese Unexamined Patent Publication (Kokai) No. 2003-158481).

Further, in a wireless communications system using the TDMA system, a wireless communications system has been proposed which detects the field strength of a transmission signal from a peripheral cell by utilizing the time of idle time slots originally not used by the mobile station and transmits the detection result to a base station to request handover (refer to, for example, Japanese Unexamined Patent Publication (Kokai) No. 3-268697).

In order for a mobile station to secure handover in a wireless communications system, it therefore has to detect a peripheral cell, but provisioning a receiving unit merely for the detection of a peripheral cell is impractical/impossible, both in terms of space and in terms of power consumption. Accordingly, the mobile station detects a peripheral cell using the frequency of the peripheral cell, the wireless access scheme, etc. However, in the HSDPA and next generation mobile communications, signals are transmitted and received by the packet format through a shared channel. Therefore, there are cases where signals are transmitted in frames of consecutive packets and cases where signals are intermittently transmitted. Whether or not such packets are transmitted is notified for each frame by the signaling from the base station. Therefore, a mobile station must constantly receive the signal from the base station. This makes it difficult to detect the peripheral cell efficiently.

Further, in the conventional example where a mobile station receives a beacon and shifts to a communication suppression mode when the result of measurement of the level of reception is less than a threshold value, there is a problem in that a period where no data can be received at all is continuously generated for a predetermined time during this communication suppression mode.

Namely, this presents a problem in that the transmission efficiency is remarkably lowered. Further, in order to store data in this communication suppression mode, it is necessary to provide a buffer memory having a relatively large storage capacity.

SUMMARY OF THE INVENTION

An object of the present invention is to suppress the deterioration of transmission efficiency when detecting a peripheral cell for handover in a case where data is transmitted via a shared channel.

To attain the above object, according to the present invention, there is provided a wireless communications system for packet communications between a mobile station and a base station, wherein at least one mobile station and base station notifies a frame position with the possibility of transmission of packets and the mobile station shifts to a peripheral cell detection mode at a frame position without the possibility of transmission of packets other than a frame position with the possibility of transmission of packets.

Further, the present invention teaches the notification of a frame position with the possibility of transmission of packets by one signal between the mobile station and the base station.

Further, according to the present invention, the mobile station determines that a next frame position is also a frame position with the possibility of transmission of packets when packet transmission is actually carried out at a frame position with the possibility of transmission of packets determined between the mobile station and the base station, and determines that a next frame position is a frame position without the possibility of transmission of packets when frame transmission is actually not carried out at a frame position with the possibility of transmission of packets, and shifting to a peripheral cell detection mode at a frame position without the possibility of transmission of packets.

Further, at least one mobile station and base station notifies a frame position with the possibility of transmission of packets based on a frame period and an offset value of the packet transmission, making at least one of the frame period and the offset value different for at least one of the mobile station and the base station, and notifying this between the mobile station and the base station.

Further, the base station of the present invention is a base station for packet communications with a mobile station and is provided with a notifying unit for notifying a frame position with the possibility of transmission of packets to the mobile station and a controlling unit for activating the notifying unit when detecting that a reception quality according to reception quality information from the mobile station falls to less than a threshold value.

Further, the notifying unit (for notifying the frame position with the possibility of transmission of packets) is designed to make at least one of the period (indicating frame positions with the possibility of transmission of packets and the offset value) different for a cell or sector and notifying unit notifies the same to the mobile station.

Further, provision is made for making at least one of the period (indicating frame positions with the possibility of transmission of packets) and the offset value different for the mobile station and for notifying the same.

Further, the mobile station of the present invention is a mobile station for packet communications with a base station, wherein the mobile station receives a signal from the base station, detects a reception quality of the received signal, and transmits a request for shifting to a peripheral cell detection mode to the base station when the reception quality falls to less than a threshold value and determines a frame position without the possibility of transmission of packets from a frame position with the possibility of transmission of packets notified with the base station and shifts to the peripheral cell detection mode at a frame position without the possibility of transmission of packets.

The mobile station is provided with a measuring unit for receiving a signal from a base station and measuring the quality of the received signal, a transmitting unit for transmitting information of the reception quality measured by the measuring unit to the base station, a comparing unit for comparing the reception quality against a threshold value, a transmitting unit for transmitting a request for shifting to a peripheral cell detection mode to the base station when detecting that the reception quality falls to less than the threshold value (using the comparing unit), and a discriminating unit for discriminating a frame position without the possibility of transmission of packets according to the information of a frame position with the possibility of transmission of packets based on the period and offset value notified with the base station and shifting to the peripheral cell detection mode at a frame position without the possibility of transmission of packets.

Further, the mobile station is further provided with a determining unit for determining if a next frame position is also a frame position with the possibility of transmission of packets when packet transmission is actually carried out at the frame position with the possibility of transmission of packets notified to the base station, determining that a next frame position is a frame position without the possibility of transmission of packets when the packet transmission is actually not carried out at the frame position with the possibility of transmission of packets, and shifting to the peripheral cell detection mode at the frame position without the possibility of transmission of packets.

Further, according to another aspect of the present invention, there is provided a wireless base station able to sequentially transmit wireless frames storing data addressed to a mobile station selected from among a plurality of mobile stations wherein the wireless base station is provided with a detecting unit for detecting a specific mobile station requiring measurement of a received signal from a peripheral cell and a controlling unit for discontinuously generating wireless frames not storing data for the specific mobile station among the wireless frames sequentially transmitted after detection by the detecting unit and including the specific mobile station in the candidates for the selection for wireless frames between discontinuously generated adjacent wireless frames.

Further, the discontinuously generated wireless frames store data addressed to other mobile stations.

Further, according to another aspect of the present invention, there is provided a wireless base station able to sequentially transmit wireless frames storing data addressed to a mobile station selected from among a plurality of mobile stations, wherein the wireless base station is provided with a detecting unit for detecting a specific mobile station requiring measurement of a received signal from a peripheral cell, a notifying unit for notifying information enabling identification of discontinuous wireless frames not storing data for the specific mobile station to the specific mobile station, and a controlling unit for generating discontinuous wireless frames not storing data for the specific mobile station (after notification by the notifying unit) and including the specific mobile station in the candidates for selection for wireless frames between the discontinuously generated adjacent wireless frames.

Further, the information enabling identification may be information enabling identification of discontinuous wireless frames based on pre-announcement of transmission of wireless frames storing data addressed to the specific mobile station or information enabling identification of discontinuous wireless frames based on wireless frames storing data addressed to the specific mobile station.

Further, according to another aspect of the present invention, there is provided a mobile station for receiving a wireless signal from a wireless base station able to sequentially transmit wireless frames storing data addressed to the mobile station selected from among a plurality of mobile stations, wherein the mobile station is provided with an evaluating unit for receiving a wireless signal from a wireless base station different from the wireless base station during a period of discontinuous wireless frames not storing data for itself generated by the wireless base station and evaluating the same when it requires measurement of a received signal from a peripheral cell. Further, the mobile station can be configured so that information enabling identification of discontinuous wireless frames is notified from the wireless base station.

By the above configurations, the present invention achieves at least the following advantages.

When a mobile station detects a peripheral cell for handover, a drop in the transmission efficiency is suppressed. Further, a flexible wireless communications system can be constructed by making the period between frame positions with the possibility of transmission of packets and offset value different for the mobile station or for the sector and loss of transmission packets can be prevented.

BRIEF DESCRIPTION OF THE DRAWINGS

The above objects and features of the present invention will be more apparent from the following description of the preferred embodiments given with reference to the accompanying drawings, wherein:

FIGS. 1A and 1B are explanatory views of a first embodiment of the present invention;

FIGS. 2A and 2B are explanatory views of principal parts of transmission and reception functions of a base station;

FIGS. 3A and 3B are explanatory views of principal parts of transmission and reception functions of a mobile station;

FIG. 6 is an explanatory view of a fifth embodiment of the present invention;

FIGS. 7A and 7B are explanatory views of a sixth embodiment of the present invention;

FIGS. 8A and 8B are explanatory views of a seventh embodiment and eighth embodiment of the present invention;

FIG. 10 is an explanatory view of packet transmission using a conventional shared channel.

DESCRIPTION OF THE PREFERRED EMBODIMENTS

Figure 4A:
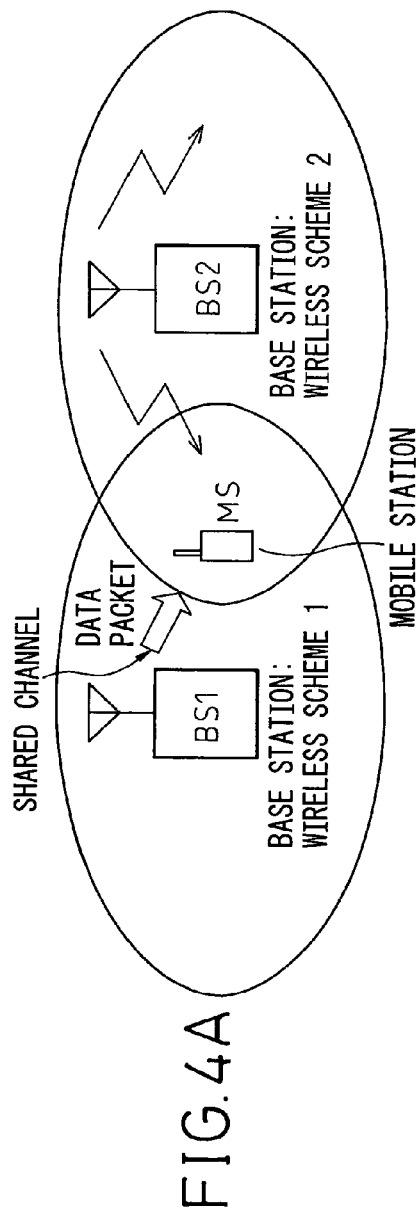
FIGS. 4A and 4B are explanatory views of a second embodiment of the present invention.

Preferred embodiments of the present invention will be described in detail below while referring to the attached figures.

Referring to FIGS. 1A and 1B, the wireless communications system of the present invention is a wireless communications system for packet communications between a mobile station MS and a base station BS1, wherein one or both the mobile station MS and base station BS1 is able to notify a frame position with the possibility of transmission of packets, and the mobile station MS is able to shift to a peripheral cell detection mode at a frame position without the possibility of transmission of packets other than a frame position with the possibility of transmission of packets and able to smoothly achieve handover.

Further, the base station of the present invention is a base station BS1 for packet communications with a mobile station MS, wherein the base station BS1 notifies a frame position with the possibility of transmission of packets to the mobile station MS and activates such notification when it detects that a reception quality, according to reception quality information (CQI: Channel Quality Information), from the mobile station MS falls to less than a threshold value.

Further, the mobile station of the present invention is a mobile station MS for packet communications with a base station BS1, wherein the mobile station MS receives a signal from the base station BS1, detecting the reception quality thereof, and transmits a request to shift to a peripheral cell detection mode to the base station BS1 when the reception quality falls to less than a threshold value and determines a frame position without the possibility of transmission of packets from a frame position with the possibility of transmission of packets notified with the base station BS1 and shifts to the peripheral cell detection mode at a frame position without the possibility of transmission of packets.

Further, the wireless base station BS1 sequentially transmits wireless frames storing data addressed to a mobile station selected from among a plurality of mobile stations via a shared channel (for example, HS-PDSCH) and detects a specific mobile station MS requiring measurement of a received signal from a peripheral cell (for example, a pilot signal (CPICH) transmitted from the peripheral cell) (detects this by, for example, receiving a report of deterioration of the reception quality from a mobile station MS or receiving a peripheral cell detection request from a mobile station detecting deterioration of the reception quality). After the detection, the wireless base station BS1 generates discontinuous wireless frames (sub frames of HS-PDSCH) not storing data for this specific mobile station MS. Then, it includes this specific mobile station MS in the candidates for selection of the mobile station for transmission of data via the shared channel for the wireless frames between these discontinuously generated wireless frames. Based on such a setup, the specific mobile station can receive data between the discontinuous wireless frames. Naturally, the discontinuous wireless frames not storing data for the specific mobile station MS can store data addressed to other mobile stations. Also, for the specific mobile station, it is not necessary to include a frame for which storage of the data is completely prohibited in the shared channel (for example HS-PDSCH). Preferably, the wireless base station BS1 notifies information enabling identification of discontinuous wireless frames not storing data to this specific mobile station MS1. By this, even if not previously determined, it becomes possible to identify the discontinuous frames.

It should noted that the identification of the discontinuous frames includes a case where discontinuous frames are identified with reference to data transmitted addressed to this specific mobile station MS and a case where discontinuous frames are specified with reference to pre-announcement of transmission of data to be transmitted addressed to this specific mobile station MS. Further, the corresponding mobile station receives a wireless signal (for example a pilot signal (CPICH)) from another wireless base station BS2 and evaluates it by utilizing the period of transmission of discontinuous wireless frames generated by the wireless base station. The evaluation includes the detection of a peripheral cell (measurement of reception quality such as reception level and reception SIR) for the handover. It should be noted that it is also possible to detect discontinuous wireless frames by receiving information identifying discontinuous wireless frames from the wireless base station.

First Embodiment

FIGS. 1A and 1B are explanatory views of a first embodiment of the present invention, in which FIG. 1A shows an outline of the wireless communications system and shows a case of a wireless communications system where a base station BS1 transmits data at a frequency f1 and a base station BS2 transmits data by a frequency f2 (frequency different from f1). It should be noted that as an example, the present invention is described in conjunction with the previously explained WCDMA mobile communications system, but, other systems, such as, mobile communications systems employing HSPDA and next generation mobile communications systems can also be used in conjunction the present invention without departing from the scope of the present invention.

The mobile station MS wirelessly communicates with the base station BS1 (during service for reception of data via a shared channel as in the HSDPA). When moving to the direction of the base station BS2 while receiving packets, the reception quality (for example, reception power of the pilot signal) from the base station BS1 gradually falls. Therefore, the processing for detection of a peripheral cell becomes necessary in order to perform handover. In this case, the base station BS2 of the peripheral cell transmits data at the frequency f2. The mobile station MS cannot simultaneously receive the frequencies f1 and f2, therefore switches the reception frequency to the frequency f2 and shifts to the mode for detection of a peripheral cell by the common channel reception. In that case, the base station is able to determine a frame position with the possibility of transmission of packets (for example, transmission of data in units of frames having predetermined lengths via the shared channel as in the HS-PDSCH) and a frame position without that possibility (and notifying the same via the control channel), while the mobile station MS is able to shift to a peripheral cell detection mode at a frame position without the possibility of transmission of packets, thereby shifting to the peripheral cell detection mode.

FIG. 1B shows frame positions with the possibility of transmission of packets by hatching. The other portions show examples of frame positions without the possibility of transmission of packets. Without shifting to the compressed mode explained above, the mobile station MS shifts to the peripheral cell detection mode at a frame position without the possibility of transmission of packets (period of transmission of discontinuous frames) determined with the base station BS1. In this peripheral cell detection mode, the mobile station MS switches the frequency from f1 to f2 and measures the reception quality from the base station BS2. Namely, the mobile station MS has a measuring unit for measuring the reception quality of the signal by the frequency f1 from the base station BS1. It compares the information of this reception quality and the threshold value. When detecting that the reception quality falls to less than the threshold value, the mobile station MS transmits a request for shifting to the peripheral cell detection mode to the base station BS1. Alternatively, the mobile station MS transmits the information of the reception quality to the base station BS1, and the base station BS1 instructs the mobile station MS to shift to the peripheral cell detection mode when the reception quality falls to less than the threshold value in the base station BS1. Then, the base station BS1 notifies the information of a frame position with the possibility of transmission of packets between the base station BS1 and the mobile station MS, and the mobile station MS decides the position is a frame position without the possibility of transmission of packets and shifts to the peripheral cell detection mode. Namely, the mobile station MS switches the frequency to f2 and receives the signal of the common channel from the base station BS2.

For example, by limiting the numbers of the frames with the possibility of transmission of packets to frames designated by a period A and an offset value B such as A×n+B (where n is an integer), it is possible to use the period of frames without the possibility of transmission of packets and switch the frequency or the receiving scheme to detect a cell having a different frequency or a cell of a different system in a peripheral cell detection mode. The period A and the offset value B can be made variable in accordance with the type of the data of the communications in the visiting cell (the permitted delay time and bit rate to be guaranteed for are different), the user ID, the ability of the user equipment, etc. Further, it is also possible to transmit the packets by consecutive frames. Further, the numbers of frames with the possibility of transmission of packets of the head of continuous packets can be determined as A×n+B (where n is an integer), as explained above.

It is also possible to have the base station BS notify a specific mobile station that it will not pre-announce transmission (will not transmit packets) to this specific mobile station (the mobile station requiring detection of a peripheral cell) after 1 frame and 3 frames after pre-announcement of transmission and have this specific mobile station detect a peripheral cell after 1 frame and 3 frames from the reception of the pre-announcement of transmission addressed to itself and receive a signal through the channel performing the pre-announcement of transmission after the 2 frames in the term of the discontinuous frames from after 1 frame to after 3 frames. By performing this, the mobile station MS can detect a peripheral cell in the period of transmission of discontinuous frames for example after 1 frame and after 3 frames. At the same time, the possibility of transmission performed to itself remains for the 2 frames. The occurrence of a continuous period where a station cannot be transmitted to at all can therefore be prevented.

It should be noted that, it is also possible not to use the pre-announcement of transmission as a standard and not to pre-announce transmission to a specific mobile station (a mobile station requiring detection of a peripheral cell) for a period after 1 frame and after 3 frames from the packet transmission. It is also possible for the mobile station and the base station to store a particular rule of discontinuous wireless frames not to be transmitted and identify discontinuous wireless frames based on the stored particular rule. For example, by storing a rule not to transmit for a period after 2 frames and after 5 frames with reference to a frame transmitting (receiving) a request of detection of a peripheral cell, they can mutually match with each other.

Further, the case of starting a shift to the peripheral cell detection mode includes, for example, a case of comparing the value of CQI (Channel Quality Information) reported to the base station BS1 and the threshold value detecting that the CQI has fallen to less than a threshold value. At this time, the shift can be performed autonomously by the decision of the mobile station MS (note a report is made to the base station). At that time, the system can be configured so that requested values of the period A and offset value B are transmitted to the base station BS1 or so that the values of the period A and the offset value B are designated from the base station BS1. Further, the system can be configured so that when the value of the CQI reported from the mobile station MS becomes less than the threshold value, a shift to the peripheral cell detection mode is instructed to the mobile station MS by the decision of the base station BS1. At that time, the values of the period A and the offset value B are designated from the base station BS1. It is also possible to transmit the channel quality information from the mobile station to the base station BS1 not as transmission as the CQI in the HSDPA, but as another channel quality information (CQI) signal.

As explained above, when it becomes necessary for the mobile station MS to shift to the peripheral cell detection mode or at the time of the start of communications between the base station BS1 and the mobile station MS, by including the frame positions with the possibility of transmission of packets as parameters of the period A and the offset value in the control information, the mobile station MS can determine a frame position without the possibility of transmission of packets, so can shift to the peripheral cell detection mode at this frame position. By performing this, the mobile station MS can shift to the peripheral cell detection mode, therefore, the mobile station MS and the base station BS1 do not have to perform processing such as the change of the spread factor SF or the change of the puncturing. Accordingly, the problem of the transmission and reception processing becoming complex is avoided. Further, frame positions with the possibility of transmission of packets can be secured, so packets can be reliably transmitted and received.

FIGS. 2A and 2B are explanatory views of principal parts of the transmission and reception functions of the base station, wherein the setup comprises a transmitting/receiving antenna 1, a circulator 2, a transmitting amplifier 3, an up-converting frequency converter 4, a multiplexer 5, a modulator 6, a controller 7, a pilot channel generator 8, channel encoders 9 and 10, a signaling channel generator 11, a packet assembler 12, a scheduler 13, a switch 14, a reference oscillator 15, local oscillators 16 and 17, a low noise amplifier 18, a down-converting demodulator 19, a channel separator 20, a mobile station correspondence processing unit 21, a demodulator 22, decoders 23 and 24, a separator 25, a pilot demodulator 26, a feedback channel demodulator 27, and a data channel demodulator 28.

In FIG. 2A, the scheduler 13 includes a controlling unit to control transmission of packets (specifically, to which mobile station) for every frame based on feedback information from the mobile station (CQI based on the reception quality (SIR) of the mobile station and the ACK/NACK of the acknowledgement of reception), the amount of data addressed to each mobile station, and the degree of priority. Further, it is also possible to multiplex the data addressed to a plurality of mobile stations in the same frame by code division multiplexing, orthogonal frequency division multiplexing, or the like. Further, the switch 14 selects the data addressed to the mobile station according to the determination of the scheduler 13. Further, the packet assembler 12 assembles the packet from the data addressed to the selected mobile station, applies processing such as error correction encoding to this by the channel encoder 10, modulates this in the modulator, and inputs the result to the multiplexer 5.

Further, the signaling channel generator 11 generates control information (for example modulation type information indicating the modulation scheme for transmitting the data by HS-PDSCH, number of codes of the spreading codes, and pattern information of the rate matching processing applied to the transmission data) corresponding to the packets addressed to the selected mobile station and applies processing such as error correction encoding to this by the channel encoder 9, modulates data via modulator 6, and inputs the result to the multiplexer 5. The modulator 6 is provided with configurations of modulators corresponding to the pilot channel, the signaling channel, and the data channel. The multiplexer 5 performs the processing for multiplexing the pilot channel, the signaling channel, and the data channel. Further, the controller 7 controls the modulator 6, the multiplexer 5, the local oscillators 16 and 17, the channel separator 20, and the demodulator 22, sets the wireless access scheme, sets the carrier frequency, changes the transmission frequency or reception frequency by controlling the local oscillators 16 and 17, up-converts the multiplex signal by the multiplexer 5 to the transmission frequency by the frequency converter 4, amplifies this by the transmitting amplifier 3, and transmits the result via the circulator 2 from the antenna 1.

Further, at the reception side of the base station (FIG. 2B), the low noise amplifier 18 amplifies the signal from the mobile station received by the antenna 1, then the frequency converter 19 down-converts this and inputs it to the channel separator 20. This channel separator 20 separates the signal from the mobile station to the different channels by a method in accordance with the wireless access scheme and inputs the results to the demodulator 22 in the mobile station correspondent processing unit 21. FIG. 2B illustrates the case where the result is separated to a pilot channel, a feedback channel, and a data channel. The demodulator 22 is provided with a pilot demodulator 26, a feedback channel demodulator 27, and a data channel demodulator 28 corresponding to the separated channels.

The result of demodulation by the pilot demodulator 26 is used for compensating for any waveform distortion in the transmission line at the time of demodulation of the feedback channel and data channel from the mobile station. Further, the decoding unit 23 decodes the result of demodulation of the feedback channel for decoding the channel encoding and extracting the feedback information from the mobile station and forwards this to the scheduler 13. This feedback information includes the reception quality information measured at the mobile station (for example, CQI can be used) and the information of ACK/NACK prepared based on the data decoding result at the mobile station.

Further, the decoder 24 decodes the result of demodulation of the data channel for decoding the channel encoding, then the separator 25 separates it to the control information and the transmission data and forwards the control information to the scheduler 13. It should be noted that when a request to shift to the peripheral cell detection mode is transmitted from the mobile station, the request to shift to the peripheral cell detection mode will be included in this control information. Therefore, the scheduler 13 can detect that the measurement of the received signal from a peripheral cell is necessary for the mobile station.

Further, even when no request to shift to the peripheral cell detection mode is transmitted from the mobile station, due to the transmission of the channel quality information from the mobile station, the channel quality information will be included in this control information, so the scheduler 13 can detect that the mobile station needs to measure the received signal from a peripheral cell. In any case, the scheduler 13 further comprises a detecting unit to perform such detection. Further, the scheduler 13 also comprises a control unit, so when detection is carried out by the detecting unit, the control unit performs scheduling so that wireless frames not containing data for a specific mobile station among the packets (wireless frames) which are sequentially transmitted are discontinuously generated after detection of the detected specific mobile station. Between these discontinuously generated wireless frames, storage of data for this specific mobile station is permitted (that is, this specific mobile station is also treated as a candidate of transmission at the time of scheduling).

Preferably, between these discontinuously generated wireless frames, desirably the degree of priority is raised for the specific mobile station so that the possibility of selecting the specific mobile station for transmission becomes high. Selection with a high priority enables the period during which data is not received becoming longer is prevented. It should be noted that it is not necessary to change the frame length of the wireless frames (wireless sub frames) before and after such discontinuous generation. Namely, the specific mobile station can receive wireless frames having fixed (predetermined) lengths also during the time of cell detection.

The scheduler 13 can function further comprises a notifying unit to generate instructions to the mobile station for a shift to the peripheral cell detection mode and information of frame positions allowing (not allowing) packet transmission, and transmitting the same.

It should be noted that the notifying unit can transmit the information required for identifying the discontinuous wireless frames generated by the above control unit in this way to the specific mobile station. The signaling channel can be used as the channel for pre-announcing transmission to the specific mobile station, and the shared channel is used for transmitting packets (data) to the specific mobile station, and other individual channels. Further, the example of the case where a notification and request between a base station and a mobile station for shifting to the peripheral cell detection mode explained above are multiplexed on the data channel together with the transmission data for transmission is shown, but it is also possible to prepare another channel and perform the notification and request between the base station and the mobile station for shifting to the peripheral cell detection mode on another channel.

FIGS. 3A and 3B are explanatory views of principal parts of the transmission and reception functions of a mobile station, wherein the setup comprises an antenna 31, a circulator 32, a transmitting amplifier 33, an up-converting frequency converter 34, a multiplexer 35, a modulator 36, a controller 37, a pilot channel generator 38, channel encoders 39 and 40, a feedback channel generator 41, a data channel generator 42, a reference oscillator 43, local oscillators 44 and 45, a low noise amplifier 56, a down-converting demodulator 47, a channel separator 48, a demodulator 49, a received signal quality measuring unit 50, decoders 51 and 52, a separator 53, a pilot demodulator 54, a signaling channel demodulator 55, and a data channel demodulator 56.

The transmission side of the mobile station (FIG. 3B) generates the pilot channel by the pilot channel generator 38 and inputs this to the modulator 36. Further, the feedback channel generator 41 generates the information to be fed back to the base station (based on the measurement result (CQI) of the received signal quality measuring unit 50 (FIG. 3A) and the result of decoding in the data channel), applies processing such as error correction encoding at the channel encoder 39, and inputs the result to the modulator 36. Further, when there is transmission data and control information (request of shift to the peripheral cell detection mode, the quality information of the received signal from the base station from which it receives the service, etc.) to be transmitted to the base station, the data channel generator 42 performs processing for multiplexing the data, etc., applies processing such as error correction encoding at the channel encoder 40, and inputs the result to the modulator 36. The modulator 36 is configured to include a modulator corresponding to each channel, and inputs a modulated output signal corresponding to each channel to the multiplexer 35, performs the multiplex processing under the control of the controller 37, up-converts the same by the frequency converter 34 to the transmission frequency by which the controller 37 controls the local oscillator 44, amplifies it by the transmitting amplifier 33, and transmits the same from the antenna 31 to the base station.

Further, the reception side of the mobile station (FIG. 3A) receives a signal from the base station via the antenna 31, amplifies the received signal by the low noise amplifier 46, down-converts the same by the frequency converter 47 based on the oscillation output signal of the local oscillator 45, and inputs the result to the channel separator 48. The channel separator 48 separates the signal from the base station to the channels in accordance with the wireless access scheme and inputs the results to the demodulator 49. The demodulator 49 further comprises a pilot demodulator 54, a signaling channel demodulator 55, and a data channel demodulator 56 corresponding to the separated channels, wherein the demodulator 49 inputs the demodulated output signal of the pilot demodulator 54 to the signaling channel demodulator 55 and the data channel demodulator 56, compensates for the distortion of the waveform on the transmission line, inputs the demodulated output signal to the received signal quality measuring unit 50, measures the reception quality of the signal from the base station here, and inputs the measurement result to the feedback channel generator 41. When a request to shift to the peripheral cell detection mode and the quality information of the received signal (from the base station from which it receives the service) are transmitted as the transmission data, the measurement result of the reception quality is given to a generator (not shown) of transmission data. This transmission data generator (not shown) generates the shift request and quality information based on the measurement result and outputs the same as the transmission data.

Further, the demodulated output signal of the signaling channel (transmission pre-announcement channel) demodulator 55 is decoded by the decoder 51. It is decided in each sub frame whether it is a signal addressed to itself from the base station. When it is a signal addressed to itself (i.e., the specific mobile station), the signaling information is extracted. This is separated to information for the data channel demodulation and information for the data channel decoding which are input to the data channel demodulator 56 and the decoder 52. Further, when this is not a signal addressed to itself (i.e., the specific mobile station), the processing of the demodulation and decoding of the data channel is suspended.

Further, when pre-announcement of transmission of the data addressed to itself (i.e., the specific mobile station) is detected by the signaling channel, the result of the channel encoded demodulation executed by the data channel demodulator 56 is decoded in the decoder 52 and is further input to the separator 53 and the feedback channel generator 41. This separator 53 separates this input to the control information and the transmission data and forwards the same to a not shown later circuit portion.

It should be noted that the data channel demodulator 56 and the signaling channel demodulator 55 acquire information (information enabling identification of discontinuous frames) notified by the notifying unit for the base station via either of the data channel or signaling channel and forwards the information to the controller 37. As a result, during the period of transmission of discontinuous frames, the controller 37 controls the local oscillator 45 to receive the signal transmitted from the other wireless base station forming the peripheral cells, and makes the received signal quality measuring unit (evaluating unit) 50 measure the received signal from a peripheral cell.

Then, in the period between discontinuous frames, the mobile station controls the local oscillator 45 to return from the state of receiving the signal from the other wireless base station forming the peripheral cell to the state of receiving the signal from the base station from which it receives service and receives the signaling. At this time, when it detects packet are being transmitted addressed to itself (i.e., the specific mobile station) by the signaling (pre-announcement of transmission), it controls the data channel demodulator 56 etc. so as to receive the packets. If no packets are detected, it receives the next signaling. Then, when the period between discontinuous frames ends, it controls the local oscillator 45 again to receive the signal transmitted from another wireless base station forming a peripheral cell and measures the received signal from the peripheral cell from the received signal quality measuring unit (evaluating unit) 50. It should be noted that it is sufficient to measure the received signal from a peripheral cell any time before the completion of measurement is required.

Preferably, after the completion of the measurement, the mobile station notifies the completion of the detection of the peripheral cell to the base station by including a notification of completion in the transmission data. The scheduler 13 of the base station releases control over the transmission of the discontinuous frames with respect to the specific mobile station based on this notification. Further, in the case where the notification information and the information of the request between the base station and the mobile station for shifting to the peripheral cell detection mode (including the information of the frame positions with the possibility of transmission of packets explained above) are multiplexed on the data channel together with the transmission data and transmitted, it is also possible to employ a configuration preparing another channel and performing the notification and request between the base station and the mobile station for shifting to the peripheral cell detection mode. Further, the mobile station may also be provided with a controller for transmitting a request to shift to the peripheral cell detection mode to the base station when the result of measurement of the reception quality by the received signal quality measuring unit 50 is also input to the controller 37 where it is compared against a threshold value to detect if the reception quality falls to less than the threshold value.

Second Embodiment

Figure 4B:
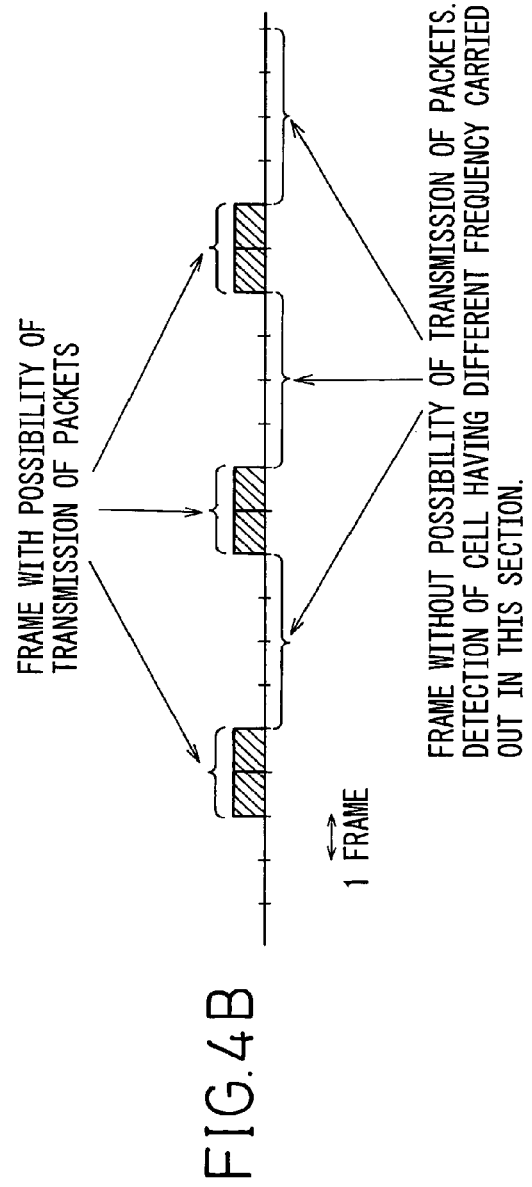

FIGS. 4A and 4B are explanatory views of a second embodiment of the present invention, in which FIG. 4A is a schematic view of a wireless communications system. The base stations BS1 and BS2 are systems for transmission and reception in a wireless communications system where the wireless access schemes can be, for example, W-CDMA or OFDM-based schemes. The base station BS1 uses a wireless scheme 1, while the base station BS2 uses a wireless scheme 2. When a mobile station MS engages in wireless communications with the base station BS1 and moves in the direction of the base station BS2 while receiving the data packets, the reception quality from the base station BS1 is gradually lowered. Therefore, the processing for detection of a peripheral cell becomes necessary for handover.

In this case, the base station BS2 of the peripheral cells is configured to transmit by the wireless scheme 2, therefore the mobile station MS cannot simultaneously handle the wireless schemes 1 and 2. Therefore, in the same way as the above explained case, the mobile station MS performs processing for shifting to the peripheral cell detection mode. Namely, the mobile station determines the frame positions with the possibility of transmission of data packets and the frame positions without the possibility with the base station BS1 via the control channel etc. and switches to the peripheral cell detection mode at a frame position without the possibility of transmission of packets. In this case, the mobile station switches from the wireless scheme 1 to the wireless scheme 2 and receives and judges the transmission signal by the common channel of the base station BS2. In this case, in place of switching the frequency of the local oscillators 16, 17, 44, and 45 in FIGS. 2A, 2B and FIGS. 3A, 3B, switching of the demodulator and modulator is provided.

In FIG. 4B, the frames with the possibility of transmission of packets are shown by hatching, while the frames without the possibility of transmission of packets are shown otherwise. Without shifting to the compressed mode, the mobile station MS shifts to the peripheral cell detection mode at a frame position without the possibility of transmission of packets determined with the base station BS1. In this peripheral cell detection mode, as previously explained, it switches from the wireless scheme 1 to the wireless scheme 2 to measure the reception quality from the base station BS2. When the reception quality from the base station BS1 by the wireless scheme 1 falls to less than, for example, the reception quality by the wireless scheme 2 from the base station BS2, the mobile station MS transmits a request for handover processing, switches from the base station BS1 to the base station BS2 by known various controlling means, and continues the reception of the packets.

For example, in the same way as the case of the frequencies f1 and f2, by limiting the numbers of the frames with the possibility of transmission of packets to frames designated by the period A and the offset value B like for example A×n+B (where n is an integer), the mobile station uses the period of frames without the possibility of transmission of packets (A-1) to switch from the wireless scheme 1 to the wireless scheme 2 and shifts to the detection mode of a peripheral cell of a different scheme. The period A and the offset value B in this case can be made variable in accordance with the type of the data for communication in the visiting cell (differing in the permitted delay time and the bit rate to be compensated), the user ID, the ability of the user, etc. Further, it is also possible to transmit packets by consecutive frames. Further, the numbers of the frames allowing transmission of packets of the heads of consecutive packets can be determined like A×n+B (where n is an integer) explained above. It should be noted that it is also possible to employ a wireless communications system wherein the same base station uses a plurality of wireless schemes and assign a wireless scheme selected from among the plurality of wireless schemes to the mobile station corresponding to the state of congestion of the communication of this base station or by detecting the deterioration of the reception quality. Further, it is within the scope of the present invention to instruct the switching of the wireless schemes and the switching of frequencies to the mobile station in a wireless communications system, wherein the same base station can switch among a plurality of frequencies and switch among a plurality of wireless schemes.

Third Embodiment

Figure 5A:
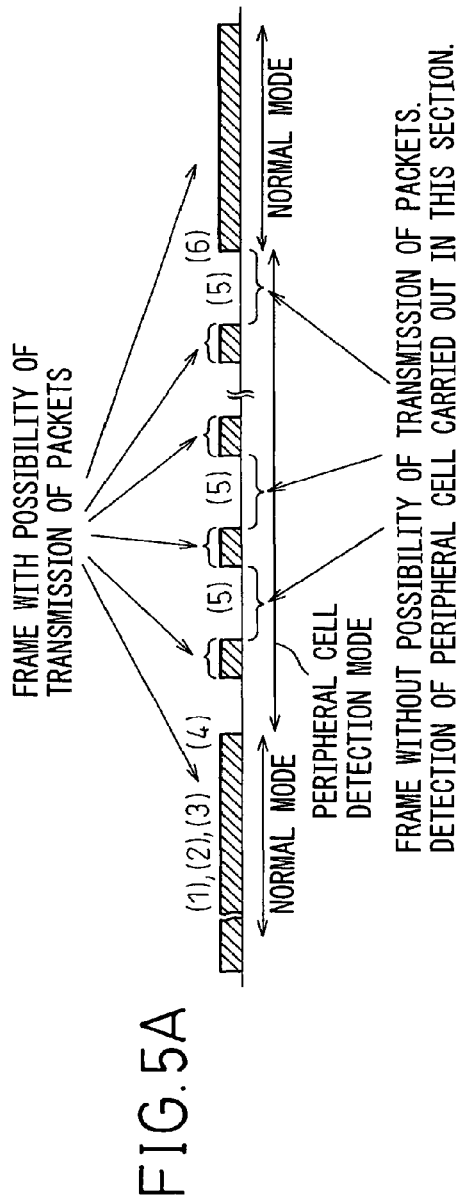
FIGS. 5A and 5B are explanatory views of a third embodiment and fourth embodiment of the present invention.
Figure 5B:
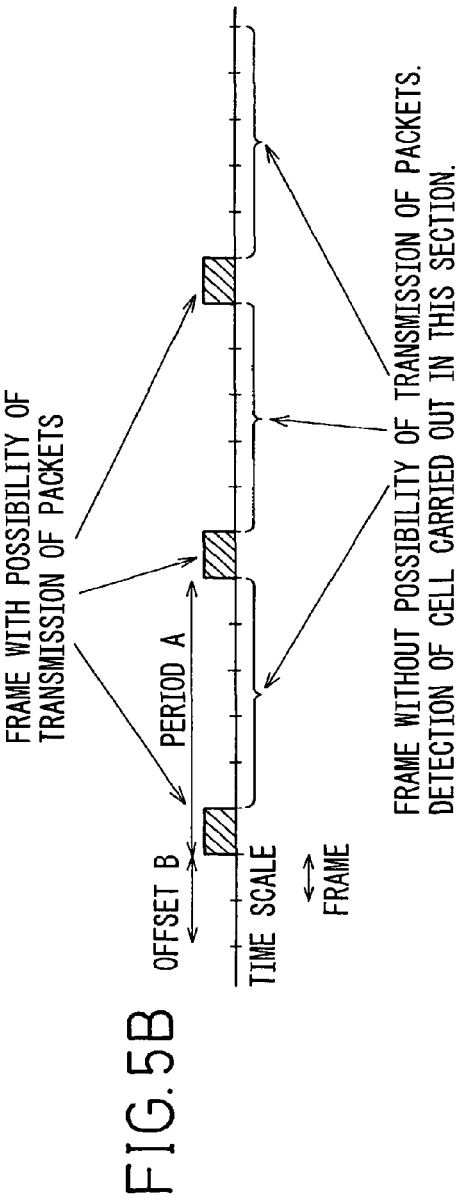
Figure 9:
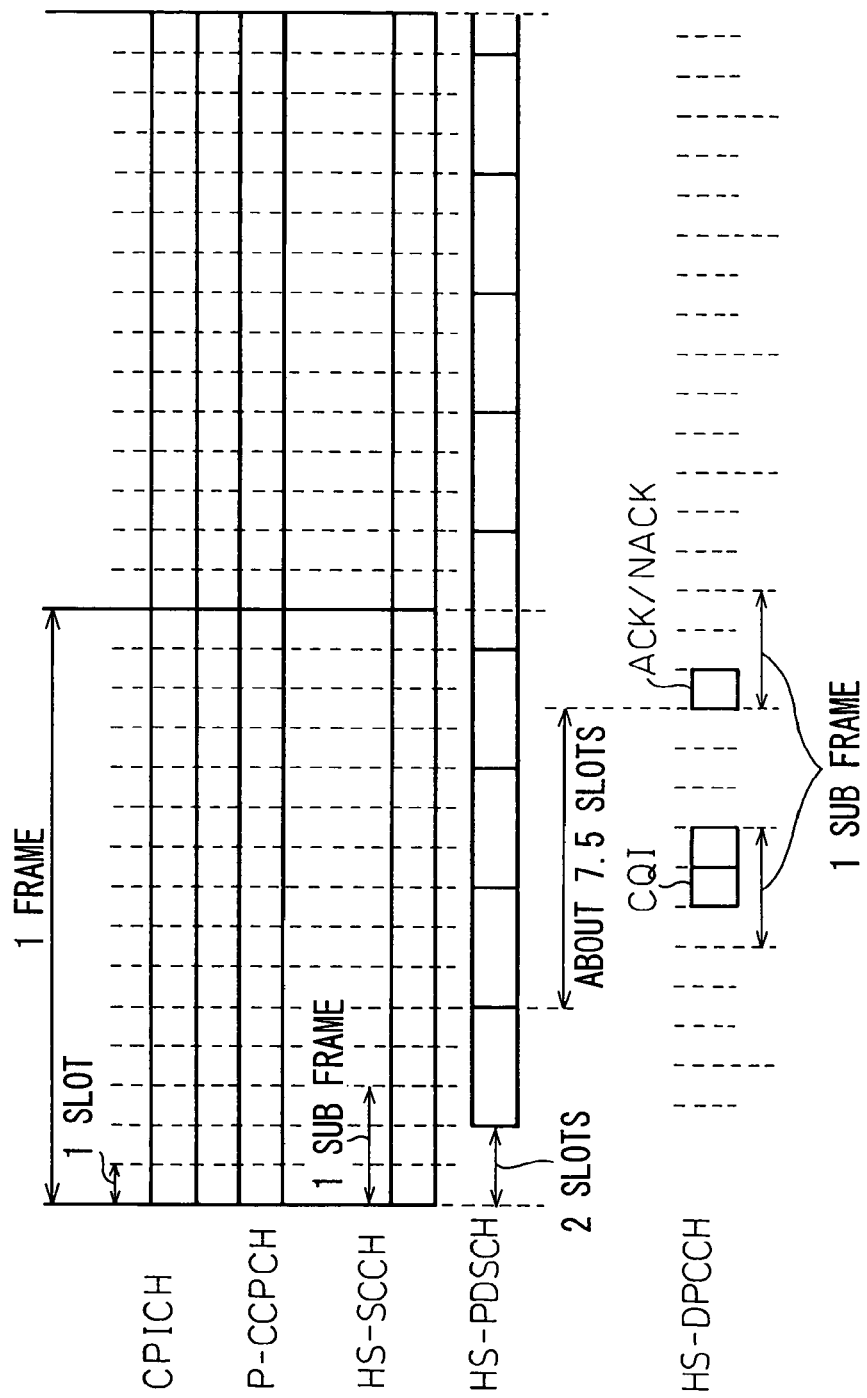
FIG. 9 is an explanatory view of a channel configuration in the HSDPA.

FIGS. 5A and 5B are explanatory views of a third embodiment and a fourth embodiment of the present invention. The third embodiment of the present invention shown in FIG. 5A shows a case of using the procedures of the following (1) to (6) when shifting to the peripheral cell detection mode. That is, (1) when the base station or the mobile station detects the conditions for shift to the peripheral cell detection mode due to the drop of the reception quality etc. in the normal mode, (2) information of (1) is notified/communicated between the base station and the mobile station, and information concerning the frames with the possibility of transmission of packets in the peripheral cell detection mode (parameters such as the period A and offset value B and duration) are notified from each other;

(3) the above (2) is acknowledged;

(4) the mobile station shifts to the peripheral cell detection mode by confirming the acknowledgement, (5) the mobile station monitors for signaling of the original base station and receives any packets addressed to itself in frames with the possibility of transmission of packets, detects and measures a peripheral cell by the peripheral cell detection mode in frames without the possibility of transmission of packets; and (6) after the end of a period enabling a shift to the peripheral cell detection mode, that is, the end of a frame period without the possibility of transmission of packets, the normal mode is returned to.

In the procedures of the above (2) and (3), it is within the scope of the present invention to notify the information (parameters such as period and duration) concerning frames with the possibility of transmission of packets in the peripheral cell detection mode by a single signal. Even when a relatively long time is taken for detecting a peripheral cell, the drop in the transmission efficiency due to the signaling along with the shift to the peripheral cell detection mode can be limited to the lowest level. Further, the time of the frames able to be used for the packet transmission can be secured, therefore the peripheral cell can be detected while maintaining the speed of the data communications with the original base station to a certain extent. Further, the above procedures can be realized by the controlling unit of the controller 37 of the mobile station shown in FIG. 3A.

Fourth Embodiment

In fourth embodiment of the present invention shown in FIG. 5B, for designating the frames with the possibility of transmission of packets in the peripheral cell detection mode, the period A and the offset value B are designated as the parameters of the peripheral cell detection mode between the base station and the mobile station. The offset value B is an amount indicating from which frame the frames with the possibility of transmission of packets first begin from a certain time reference (for example, the frame of the system frame number (SFN)=0). Further, the period A is the period between one frame and another frame with the possibility of transmission of packets and shows a case where a frame with the possibility of transmission of packets is designated periodically, one time every A number of frames. Accordingly, in the sections of the remaining (A-1) number of frames, it is possible to shift to the peripheral cell detection mode.

Fifth Embodiment

FIG. 6 is an explanatory view of a fifth embodiment of the present invention and shows a case where the detection of a peripheral cell is enabled by the procedures of (1) to (12). In the above fourth embodiment, the frames with the possibility of transmission of packets were limited to only the frames designated in a certain period, but the fifth embodiment employs a system configuration allowing continuous packet transmission in consecutive frames in addition to periodic frames so as to enable a case where the traffic increases during the peripheral cell detection mode. For this reason, the base station and the mobile station designate between them the period A and the offset value B as the parameters of the peripheral cell detection mode and designate the frames allowing the start of packet transmission (the hatched frames (1), (4), and (9)) using the period A and the offset value B. When there is packet transmission in these frames, the packets may be transmitted in the same way in the following frames (2), (5), and (10). Therefore, the existence of any packet transmission is monitored.

In the illustrated case, as the result of monitoring for reception of packets in the frame (2), no packet transmission is detected. Therefore, in the next frame (3) on, it is decided there is no packet transmission at the frame positions and the peripheral cell detection mode can be shifted to. Further, packet transmission is detected at the frame (5) and the next frame (6), so the existence of the packet transmission in the next frame (7) is monitored. When it is detected that no packet transmission is then carried out, the peripheral cell detection mode can be shifted to in the frame (8) next to the frame (7), and so on. In the same way, when there is no packet transmission in the frame (11) next to the frame (10), the peripheral cell detection mode can be shifted to in the next frame (12), and so on. Accordingly, even when the traffic increases in the peripheral cell detection mode and the packets to be transmitted increase, packet transmission in consecutive frames can be enabled. Therefore, the rate of the data communications with the base station connected with at present can be raised without returning to the normal mode, etc. The controlling unit, in this case, can be realized by, for example, the processing functions of the scheduler 13 shown in FIG. 2A and the controller 37 shown in FIG. 3A.

Sixth Embodiment

FIGS. 7A and 7B are explanatory views of a sixth embodiment of the present invention, in which FIG. 7A shows an example of a case where the transmission rate is high, and FIG. 7B shows an example of a case where the transmission rate is low. This shows an embodiment where the number of frames with the possibility of transmission of packets in the peripheral cell detection mode is made variable depending on the type of the wireless communications (nature of transmission rate, etc.) with the base station to which the mobile station is presently connected. When the characteristic of the data communications (for example, the data transmission rate) with the presently connected base station is large, or when the guaranteed bit rate is large or when the permitted delay time is small, as shown in FIG. 7A, the period A1 of the frames with the possibility of transmission of packets is set short. Conversely, when the transmission rate is small or the guaranteed bit rate is small and the permitted delay time is long, as shown in FIG. 7B, the period A2 of the frames with the possibility of transmission of packets is set long. It should be noted that, the case where the offset value B is made constant is shown, but this offset value B can also be made variable.

Seventh Embodiment

FIGS. 8A and 8B are explanatory views of a seventh embodiment and an eighth embodiment of the present invention. In the seventh embodiment of the present invention shown in FIG. 8A, the period A1 of the frames with the possibility of transmission of packets and the offset value B1 are set with respect to the user 1, and the period A2 of the frames with the possibility of transmission of packets and the offset value B2 are set with respect to the other user 2. In this case, it is possible to make the offset values B1 and B2 the same and make the periods A1 and A2 different or conversely make the periods A1 and A2 the same and make the offset values B1 and B2 different. Further, by making at least one of the period or offset value different as explained above for a plurality of users, concentration of the packet transmission for a large number of users at the same time can be avoided.

Eighth Embodiment

In the eighth embodiment of the present invention shown in FIG. 8B, the period of the frames with the possibility of transmission of packets of the packet and offset value are set to become different for each of the base stations 1 and 2. That is, the case where the offset value B1 for the base station 1 and the offset value B2 for the base station 2 are made different and where the period A1 of the frames for the base station 1 and the period A2 of the frames for the base station B2 are made different is shown. Due to this, even when the common channel from the base station used for detecting a peripheral cell is not always transmitted, the detection of a peripheral cell can be enabled. For example, this is a communication format where the pilot is transmitted only when data packets are transmitted. Here, in the case of using the pilot channel attached to a packet addressed to another mobile station for detecting a peripheral cell and when one mobile station is connected to each base station at adjacent base stations and the mobile stations connected to each base station detect peripheral cells at almost the same time, at least one of the period or offset value is made different for each adjacent base station. By transmitting the packets at timings different from each other in this way, it becomes possible to detect a peripheral cell by using the pilot channel accompanied with a packet addressed to the mobile station connected to the base station for measurement.

Ninth Embodiment

In ninth embodiment of the present invention shown in FIG. 8B, a packet communications system like the HSDPA explained above performs AMC (Adaptive Modulation and Coding) for adaptively changing the encoding unit (encoding rate, etc.) of the error correction encoding scheme and the modulation scheme in accordance with the environment of the transmission line between the base station and the mobile station. By measuring the SIR from for example the received signal quality measuring unit 50 shown in FIG. 3A etc. in the mobile station, the mobile station generates the reception quality information of the transmission line (CQI=Channel Quality Information) and reports this to the base station by the feedback channel. In the mobile station in that case, when it is detected that the measured SIR or reported CQI value becomes lower than a certain set value, that is, when it is detected in, for example, the controller 37 in FIG. 3A that the measured SIR or reported CQI value becomes lower than the threshold value, a peripheral cell detection mode shift request is transmitted from the mobile station to the base station. At a frame position other than a frame position with the possibility of transmission of packets explained above, a shift is made to the peripheral cell detection mode. In this case, the frame positions with the possibility of transmission of packets in adjacent cells or sectors can be set different from each other. Further, it is also possible to change the period of the frame positions with the possibility of transmission of packets and offset value all the time.

10th Embodiment

A 10th embodiment of the present invention, in the same way as the case of the ninth embodiment explained above, provides a packet communications system like HSDPA which performs AMC (Adaptive Modulation and Coding) for adaptively changing the encoding unit (encoding rate, etc.) of the error correction encoding scheme and the modulation scheme in accordance with the environment of the transmission line between the base station and a mobile station. The mobile station measures the SIR by, for example, the received signal quality measuring unit 50 shown in FIG. 3A, generates the reception quality information of the transmission line (CQI=Channel Quality Information), and reports this information to the base station. Therefore, when the base station detects by, for example, the scheduler 13 etc. shown in FIG. 2A that the CQI value reported from the mobile station has become lower than a certain set value, the base station can request the mobile station to shift to the peripheral cell detection mode.

While the invention has been described with reference to specific embodiments chosen for purpose of illustration, it should be apparent that numerous modifications could be made thereto by those skilled in the art without departing from the basic concept and scope of the invention.

What is claimed is:

1. A wireless communications system for performing a packet communication between a plurality of mobile stations and a base station, the wireless communications system comprising:
a base station including a transmitting unit that transmits into notifying a specific mobile station among the plurality of mobile stations of a plurality of wireless frames with a possibility of a packet transmission toward the specific mobile station, and
a mobile station including a determination unit that determines a frame as a first determined frame with the possibility of the packet transmission to the mobile station which is positioned from a frame that is notified as a frame with the possibility of start of transmission of packets to the mobile station and packet transmission to the mobile station is actually carried out to another frame which satisfies a predetermined condition, determines a frame, after satisfying the predetermined condition, as a second determined frame without the possibility of a packet transmission to the mobile station, and shifts to a peripheral cell detection mode at the second determined frame.

2. The wireless communications system as set forth claim 1 wherein said determination unit determines a frame as a first determined frame with the possibility of the packet transmission to the mobile station which is positioned from a frame that is notified as a frame with the possibility of start of transmission of packets to the mobile station and packet transmission to the mobile station is actually carried out to another frame which is determined as a first determined frame but packet transmission to the mobile station is detected as not actually carried out, and determine a frame as a second determined frame without the possibility of packet transmission to the mobile station after detecting that the packet transmission to the mobile station is not actually carried out at the first determined frame.

3. The wireless communications system as set forth claim 1, wherein said information notifies a frame period and offset value of a plurality of wireless frames with the possibility of start of transmission of packets to the specific mobile station.

4. The wireless communications system as set forth claim 3, wherein said information notifies said frame period and offset value by making at least one of the frame period and offset value different in correspondence with at least one of said specific mobile station, base station and either cell or sector.

5. A mobile station in a wireless communications system for performing a packet communication between a plurality of mobile stations and a base station, the mobile station comprising:
a reception unit that receives information transmitted from said base station notifying a specific mobile station among the plurality of mobile stations of a plurality of wireless frames with a possibility of start of transmission of packets toward the mobile station; and
a determination unit that determines a frame as a first determined frame with the possibility of the packet transmission to the mobile station which is positioned from a frame that is notified as a frame with the possibility of start of transmission of packets to the mobile station and packet transmission to the mobile station is actually carried out to another frame which satisfies a predetermined condition, determines a frame, after satisfying the predetermined condition, as a second determined frame without the possibility of a packet transmission to the mobile station, and shifts to a peripheral cell detection mode at the second determined frame.

6. The mobile station in a wireless communications system as set forth claim 5, wherein said determination unit determines a frame as a first determined frame with the possibility of the packet transmission to the mobile station which is positioned from a frame that is notified as a frame with the possibility of start of transmission of packets to the mobile station and packet transmission to the mobile station is actually carried out to another frame which is determined as a first determined frame but packet transmission to the mobile station is detected as not actually carried out, and determine a frame as a second determined frame without the possibility of packet transmission to the mobile station after detecting that the packet transmission to the mobile station is not actually carried out at the first determined frame.

7. The mobile station as set forth claim 5, wherein said information notifies a frame period and offset value of a plurality of wireless frames with the possibility of start of transmission of packets to the mobile station.

8. The mobile station as set forth claim 7, wherein said information notifies said frame period and offset value by making at least one of the frame period and offset value different in correspondence with at least one of said mobile station, base station and either cell or sector.

9. A wireless communication method for performing a packet communication between a plurality of mobile stations and a base station, the method comprising:
transmitting, from the base station, information notifying a specific mobile station among the plurality of mobile stations of a plurality of wireless frames with a possibility of start of transmission of packets toward the specific mobile station; and
determining, at the specific mobile station, a frame as a first determined frame with the possibility of the packet transmission to the specific mobile station which is positioned from a frame that is notified as a frame with the possibility of start of transmission of packets to the specific mobile station and packet transmission to the specific mobile station is actually carried out to another frame which satisfies a predetermined condition, determining a frame, after satisfying the predetermined condition, as a second determined frame without a possibility of the packet transmission to the specific mobile station, and shifting to a peripheral cell detection mode at the second determined frame.

10. The wireless communication method as set forth claim 9, wherein said determining determines a frame as a first determined frame with the possibility of the packet transmission to the specific mobile station which is positioned from a frame that is notified as a frame with the possibility of start of transmission of packets to the specific mobile station and packet transmission to the specific mobile station is actually carried out to another frame that is determined as a first determined frame but packet transmission to the specific mobile station is detected as not actually carried out, and determines a frame as a second determined frame without the possibility of packet transmission to the specific mobile station after detecting that the packet transmission to the specific mobile station is not actually carried out at the first determined frame.

11. The wireless communication method as set forth claim 9, wherein said information notifies a frame period and offset value of a plurality of wireless frames with the possibility of start of transmission of packets to the specific mobile station.

12. The wireless communications method as set forth claim 11, wherein said information notifies said frame period and offset value by making at least one of the frame period and offset value different in correspondence with at least one of said specific mobile station, base station and either cell or sector.

* * * * *